(12) United States Patent
Barzen et al.

(10) Patent No.: US 11,110,819 B2
(45) Date of Patent: Sep. 7, 2021

(54) SEAT LATCH ASSEMBLY (71) Applicant: Lear Corporation, Southfield, MI (US)

(72) Inventors: Johannes Barzen, Pfaffenhofen (DE);
Eckhard Nock, Wolnzach (DE); Tobias Krause, Oberding (DE)

(73) Assignee: Lear Corporation, Southfield, MI (US)

( * ) Notice: Subject to any disclaimer, the term of this patent is extended or adjusted under 35 U.S.C. 154(b) by 652 days.

(21) Appl. No.: 15/942,028

(22) Filed: Mar. 30, 2018

(65) Prior Publication Data
US 2018/0281622 A1   Oct. 4, 2018

Related U.S. Application Data

(60) Provisional application No. 62/480,621, filed on Apr. 3, 2017.

(30) Foreign Application Priority Data

Mar. 14, 2018 (DE) ..................... 10 2018 203 862.7

(51) Int. Cl.
*B60N 2/015* (2006.01)
*F16B 5/06* (2006.01)
*B60N 2/36* (2006.01)

(52) U.S. Cl.
CPC ......... *B60N 2/01583* (2013.01); *B60N 2/366* (2013.01); *F16B 5/06* (2013.01)

(58) Field of Classification Search
CPC .... B60N 2/206; B60N 2/2218; B60N 2/2222; B60N 2/2236; B60N 2/2245; B60N 2/36;
(Continued)

(56) References Cited

U.S. PATENT DOCUMENTS 3,905,624 A * 9/1975 Fujita ..................... E05B 83/16
                                                          292/11
4,765,682 A * 8/1988 Satoh ....................... B60N 2/20
                                                       297/378.13
(Continued)

FOREIGN PATENT DOCUMENTS

CN   101193772 A   6/2008
CN   101636296 A   1/2010
(Continued)

OTHER PUBLICATIONS

Chinese Office Action for Application No. 201810289858.2, dated Jul. 1, 2020, 7 pages.
(Continued)

*Primary Examiner* — Amber R Anderson
*Assistant Examiner* — Alexus Camero
(74) *Attorney, Agent, or Firm* — Brooks Kushman P.C.

(57) ABSTRACT

A seat latch assembly is provided with a mounting plate with a pair of mounting apertures and a receptacle sized for receipt of a striker. A pair of bushings are each received within one of the pair of mounting apertures. A pawl is pivotally connected to a first bushing, with a latch hook to retain the striker in a latched position. An input member is operably connected to the pawl and oriented and sized relative to the receptacle to extend into the receptacle in an unlatched position to engage the striker and actuate the pawl to a latched position while moving relative to the pawl. A cover plate is mounted to the mounting plate with a guide formed therein. The input member cooperates with the guide to pivot and slide relative to the mounting plate and toward the first bushing during movement from the unlatched position to the latched position.

14 Claims, 4 Drawing Sheets

(58) Field of Classification Search
CPC ....... B60N 2/366; B60N 2/01583; F16B 5/06; F16B 2/10; Y10T 403/591; Y10T 403/599; Y10T 403/608
USPC .................................................. 403/326, 327
See application file for complete search history.

(56) References Cited

U.S. PATENT DOCUMENTS

| | | | | |
|---|---|---|---|---|
| 4,770,459 | A * | 9/1988 | Nakaiwa | B60N 2/366 248/503.1 |
| 6,012,747 | A * | 1/2000 | Takamura | B60N 2/366 292/210 |
| 6,540,272 | B2 * | 4/2003 | Spurr | E05B 85/243 292/216 |
| 6,945,585 | B1 * | 9/2005 | Liu | B60N 2/01583 292/216 |
| 7,044,552 | B2 * | 5/2006 | Muller | B60N 2/01583 296/65.03 |
| 7,243,974 | B2 * | 7/2007 | Kondo | B60N 2/01541 296/65.03 |
| 7,261,337 | B2 * | 8/2007 | Nakagome | E05B 83/24 292/216 |
| 7,631,907 | B2 * | 12/2009 | Sato | B60N 2/01583 292/216 |
| 7,762,605 | B2 * | 7/2010 | Otsuka | B60N 2/3011 296/65.03 |
| 7,926,858 | B2 * | 4/2011 | Otsuka | B60N 2/01583 292/216 |
| 7,954,898 | B2 * | 6/2011 | Van De Geer | B60N 2/01583 297/378.13 |
| 8,029,030 | B2 * | 10/2011 | Shimura | E05B 83/16 292/216 |
| 8,118,342 | B2 * | 2/2012 | Kokubo | E05C 3/24 296/65.16 |
| 8,128,135 | B2 * | 3/2012 | Maeta | E05B 77/36 292/216 |
| 8,282,141 | B2 * | 10/2012 | Paing | B60N 2/01583 292/216 |
| 8,511,723 | B2 * | 8/2013 | Otsuka | B60N 2/01583 292/216 |
| 8,708,377 | B2 * | 4/2014 | Ishikawa | B60N 2/305 292/96 |
| 8,757,678 | B2 * | 6/2014 | Heeg | B60N 2/366 292/201 |
| 9,039,048 | B2 | 5/2015 | Muller et al. | |
| 9,199,554 | B2 | 12/2015 | Muller et al. | |
| 9,493,097 | B2 * | 11/2016 | Pejathaya | B60N 2/366 |
| 9,637,027 | B2 * | 5/2017 | Seigel | B60N 2/01583 |
| 9,744,885 | B2 | 8/2017 | Handl et al. | |
| 9,855,863 | B2 * | 1/2018 | Hanaki | B60N 2/2245 |
| 9,919,627 | B2 * | 3/2018 | Handl | B60N 2/366 |
| 9,963,919 | B2 * | 5/2018 | Sugiura | E05B 85/26 |
| 10,155,460 | B2 | 12/2018 | Schug et al. | |
| 10,358,071 | B2 | 7/2019 | Rapedius et al. | |
| 10,500,983 | B2 * | 12/2019 | Mueller | E05B 77/38 |
| 2012/0301212 | A1 * | 11/2012 | Champ | B60N 2/305 403/27 |
| 2015/0061349 | A1 * | 3/2015 | Handl | B60N 2/2245 297/463.1 |
| 2016/0107546 | A1 * | 4/2016 | Barzen | B60N 2/2245 297/378.12 |

FOREIGN PATENT DOCUMENTS

| | | |
|---|---|---|
| CN | 103573030 A | 2/2014 |
| CN | 103786604 A | 5/2014 |
| DE | 102013219734 B3 | 8/2014 |
| KR | 100521585 B1 | 10/2005 |
| KR | 20080050768 A | 6/2008 |

OTHER PUBLICATIONS

German Office Action for Application No. 10 2018 203 862.7 dated Apr. 7, 2021, 14 pages.
Chinese Office Action for Application No. 201810289858.2, dated Mar. 23, 2021, 14 pages.
Translation only for Chinese Office Action for Application No. 201810289858.2, dated Jul. 1, 2020, 7 pages.

* cited by examiner

SEAT LATCH ASSEMBLY

CROSS-REFERENCE TO RELATED APPLICATIONS

This application claims foreign priority benefits under 35 U.S.C. § 119(a)-(d) to DE application 10 2018 203 862.7 filed Mar. 14, 2018 and to U.S. provisional application Ser. No. 62/480,621 filed Apr. 3, 2017, the disclosures of which are hereby incorporated in their entirety by reference herein.

TECHNICAL FIELD

Various embodiments relate to seat latch assemblies.

BACKGROUND

A seat latch assembly is disclosed in Lear Corporation US Patent Application Publication No. US 2012/0301212 A1.

SUMMARY

According to at least one embodiment, a seat latch assembly is provided with a mounting plate and a receptacle for receipt of a striker. A pawl is pivotally connected to the mounting plate. An input member is operably connected to the pawl and oriented relative to the receptacle to engage the striker and actuate the pawl to a latched position while moving relative to the pawl.

According to a further embodiment, the receptacle is sized to receive the striker with a position tolerance of at least plus or minus one half of a width of the striker.

According to another further embodiment, the pawl includes a latch hook to retain the striker in the latched position.

According to another further embodiment, the input member is sized to extend into the receptacle in an unlatched position to engage the striker.

According to at least another embodiment, a seat latch assembly is provided with a mounting plate with a pair of mounting apertures and a receptacle for receipt of a striker. A pawl is pivotally connected to one of the mounting apertures of the mounting plate. An input member is operably connected to the pawl and oriented relative to the receptacle to engage the striker and actuate the pawl to a latched position.

According to a further embodiment, a latch load application upon the latched striker is generally perpendicular to the pair of mounting apertures.

According to another further embodiment, a pair of bushings are each received within one of the pair of mounting apertures, wherein the pawl is pivotally connected to one of the pair of bushings.

According to another further embodiment, a cam catch is pivotally connected to a second mounting aperture of the pair of mounting apertures. A biasing member is operably connected to the cam catch and the pawl to bias the pawl to an unlatched position.

According to a further embodiment, the biasing member is connected to the cam catch and the input member.

According to another further embodiment, the biasing member biases the cam catch against the pawl in the unlatched position to maintain the unlatched position when the striker is not received in the receptacle.

According to another further embodiment, a cam clamp is pivotally connected to the second mounting aperture in cooperation with the cam catch. A second biasing member is operably connected to the cam clamp to bias the cam catch to engage the pawl and maintain the pawl in the latched position.

According to another further embodiment, a cam clamp is pivotally connected to the second mounting aperture. A second biasing member is operably connected to the cam clamp to bias the cam clamp to engage the pawl and clamp the pawl in the latched position.

According to a further embodiment, a cover plate is mounted to the mounting plate and spaced apart from the mounting plate to enclose the pawl and the input member therebetween.

According to a further embodiment, a guide is formed into at least one of the mounting plate and the cover plate. The input member cooperates with the guide to pivot and slide relative to the mounting plate during movement between the latched position and an unlatched position.

According to a further embodiment, the input member slides toward the mounting aperture that is pivotally connected to the pawl during movement from the unlatched position to the latched position.

According to a further embodiment, a pair of bushings are each received within one of the pair of mounting apertures. The input member is contoured to provide clearance for the one of the pair of bushings for compactness of the seat latch assembly in the latched position.

According to another further embodiment, the pair of mounting apertures are spaced apart a distance of up to forty millimeters.

According to another further embodiment, the input member further includes an input link pivotally connected to a second mounting aperture of the pair of mounting apertures of the mounting plate.

According to a further embodiment, a second link is connected to the pawl to pivot relative to the first mounting aperture with the pawl. A follower is mounted to the second link in engagement with a cam track on the input link, so that as the striker is received in the receptacle and engages the input link, the input link and the second link converge while rotating the pawl to engage and latch the striker.

According to at least another embodiment, a seat latch assembly is provided with a mounting plate with a pair of mounting apertures spaced apart a distance of up to forty millimeters and a receptacle sized for receipt of a striker with a position tolerance of at least plus or minus one half of a width of the striker. A pair of bushings are each received within one of the pair of mounting apertures. A pawl is pivotally connected to a first bushing of the pair of bushings, with a latch hook to retain the striker in a latched position. An input member is operably connected to the pawl and oriented and sized relative to the receptacle to extend into the receptacle in an unlatched position to engage the striker and actuate the pawl to a latched position while moving relative to the pawl. A latch load application upon the latched striker is generally perpendicular to the pair of mounting apertures. A cover plate is mounted to the mounting plate and spaced apart from the mounting plate to enclose the pawl and the input member therebetween. A guide is formed into at least one of the mounting plate and the cover plate. The input member cooperates with the guide to pivot and slide relative to the mounting plate and toward the first bushing during movement from the unlatched position to the latched position. The input member is contoured to provide clearance for the first bushing for compactness of the seat latch assembly in the latched position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In conventional seat latch assemblies, a pawl has an integrated closing function with a driving contour that is actuated by a striker. The striker may be received in a receptacle of the latch assembly at varying positions. Pawls are designed to receive the striker at extreme positions of the striker to pass a clamping contour of the pawl and to receive the striker upon the driving contour of the pawl. In consequence of this design principle, a distance between mounting apertures of seat latch assemblies is relatively wide, in general, around fifty to sixty millimeters. Conventional mounting aperture patterns for seat latch assemblies include two apertures that are oriented at an acute angle relative to a latch load resistance application and the load is not centered between the mounting apertures. This relationship may lead to an unfavorable load distribution between the two mounting apertures.

FIGS. 1-5 illustrate a seat latch assembly according to an embodiment and referenced by numeral 10. The latch assembly 10 may be utilized for any latching arrangement in a vehicle, such as latching a seatback to a vehicle body in a rear seating row. Of course, any latching application is contemplated for employing the latch assembly 10.

Figure 1:
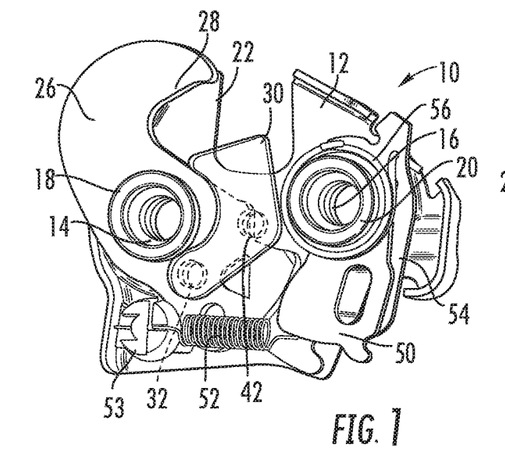
FIG. 1 is a side perspective view of a latch assembly according to an embodiment, illustrated partially disassembled in an unlatched position.
Figure 2:
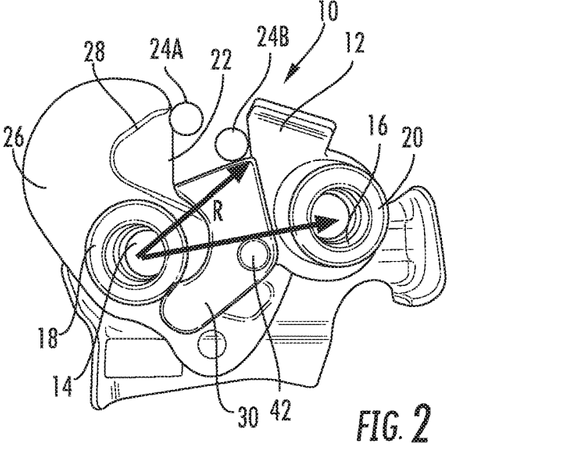
FIG. 2 is another side perspective view of the latch assembly of FIG. 1, illustrated further disassembled in the unlatched position.
Figures 3, 4, 5:
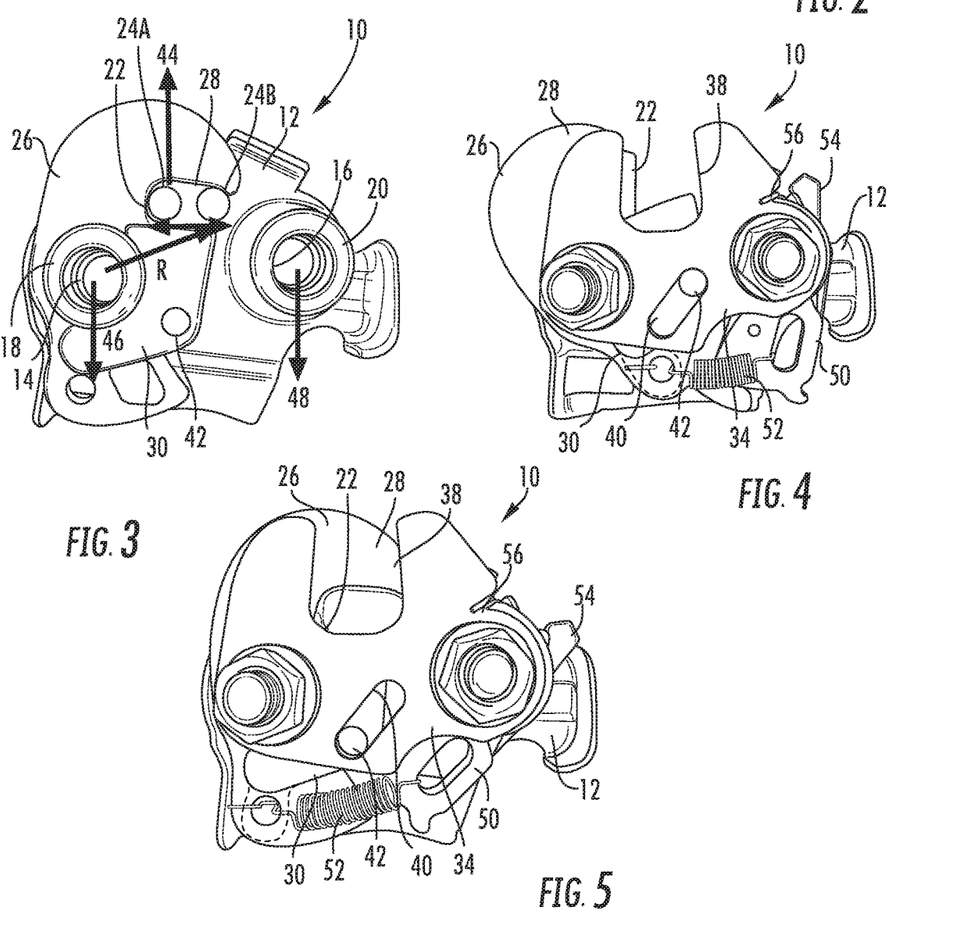
FIG. 3 is another side perspective view of the latch assembly of FIG. 1, illustrated further disassembled in the latched position.
FIG. 4 is another side perspective view of the latch assembly of FIG. 1, illustrated in the unlatched position.
FIG. 5 is another side perspective view of the latch assembly of FIG. 1, illustrated in the latched position.

The latch assembly 10 includes a base plate 12. The base plate 12 includes a pair of mounting apertures 14, 16 for mounting the latch assembly 10 to a seat component, such as a seat back (not shown). A pair of bushings 18, 20 are provided in the mounting apertures 14, 16 to provide pivotal connections for components of the latch assembly 10. A receptacle 22 is also formed in the base plate 12 for receipt of a striker 24A, 24B. The striker 24A, 24B is illustrated in FIGS. 2 and 3. The striker 24A, 24B may be stationary, and provided on a vehicle body for engagement with the latch assembly 10 upon pivoting of an associated seatback to the vehicle body. The striker 24A, 24B is depicted in two different positions as indicated by the differing reference numerals to illustrate extreme position variances due to acceptable dimensional tolerances. According to one embodiment, an acceptable tolerance may be plus or minus five millimeters for a striker with a lateral dimension, such as width or diameter, of ten millimeters. In other words, a tolerance of plus or minus one half of a width of the striker is permitted, which allows a tolerance range generally equal to the diameter of the striker.

A pawl 26 is pivotally connected to the base plate 12 about the bushing 18. The pawl 26 includes a latch hook 28 for retaining the striker 24A, 24B in a latched position of FIGS. 3 and 5. The pawl 26 is illustrated in an unlatched position in FIGS. 1, 2 and 4. An input link 30 is pivotally connected to the pawl 26 at pin 32. The pin 32 is illustrated in FIG. 1. The input link 30 is sized to extend into the receptacle 22 to engage the striker 24A, 24B. The input link 30 is driven by the striker 24A, 24B, and transmits the latching kinematics to the pawl 26. Therefore, as the latch assembly 10 receives the striker 24A, 24B from FIGS. 2 and 4 to FIGS. 3 and 5, the input link 30 is driven from the receptacle 22, thereby rotating the pawl 26 about the bushing 18 so that the latch hook 28 engages and retains the striker 24A, 24B within the receptacle 22.

The latch assembly 10 includes a cover plate 34 as illustrated in FIGS. 4 and 5. The cover plate 34 is fastened to the base plate 12 upon the bushings 18, 20. The cover plate 34 encloses the latch assembly 10 with the base plate 12. The cover plate 34 also includes a receptacle 38 for receipt of the striker 24A, 24B. A slot 40 is formed in the cover plate 34. A pin 42 connects the input link 30 to the slot 40 of the cover plate 34 so that the input link 30 can pivot relative to the pawl 26 and pivot and slide relative to the cover plate 34. This motion results in the input link 30 rotating and translating toward the bushing 18 of the pawl 26 as depicted in FIGS. 2 and 3. Consequently, a distance between the input link 30 and the first bushing 18 is reduced, while providing more clearance between the input link 30 and the second bushing 20. A radius R of an outward end of the input link 30 relative to the first bushing 18 reduces as the latch assembly 10 is latched to the striker 24A, 24B.

The latch assembly 10 with the input link 30 eliminates a driving contour on the pawl 26 as known in the prior art. The input link 30 also directly transmits the input from the striker 24A, 24B into the pawl 26, thereby requiring a smaller distance, such as forty millimeters, between the bushings 18, 20 than the prior art, while still accommodating a tolerance variation of plus or minus five millimeters for the position of the striker 24A, 24B. By reducing the dimension between the bushings 18, 20, the latch assembly 10 is more compact and a weight of the latch assembly 10 can be reduced. Additionally, and with reference to FIG. 3, the mounting apertures 14, 16 are oriented generally perpendicular to a latch load application 44 so that resultant loads 46, 48 are evenly distributed between the two mounting apertures 14, 16.

Referring now to FIGS. 1, 4 and 5 a cam catch 50 is pivotally connected to the second bushing 20. In FIGS. 4 and 5, an extension spring 52 connects the cam catch 50 to the pawl 26 to urge the pawl 26 to the open, unlatched position. Alternatively, the extension spring 52 may connect the cam catch 50 to the input link 30 as illustrated in FIGS. 4 and 5 to bias the pawl 26 to the open and unlatched position. According to another embodiment, the extension spring 52 may connect the cam catch to a post 53 mounted to translate along the base plate 12 as illustrated in FIG. 1 to engage the pawl 26 to pivot the pawl 26 counter-clockwise. Upon receipt of the striker 24A, 24B into the receptacles 22, 38, the striker 24A, 24B engages the input link 30 and overcomes the bias of the spring 52, thereby actuating the input link 30 and consequently the pawl 26.

A cam clamp 54 is also pivotally connected to the second bushing 20 as illustrated in FIGS. 1, 4 and 5. A torsion spring 56 is connected to the cam clamp 54 and the cover plate 34 to actuate the at least one of the cam catch 50 and the cam clamp 54 into engagement with the pawl 26. Once the pawl 26 is in the latched position, the cam clamp 54 engages the pawl 26 to clamp the pawl 26 upon the striker 24A, 24B.

Conventional latch assemblies that utilize an extended finger arm on the pawl have got the exigency for a wide distance between a pivot of a pawl and a pivot of a clamping cam (which is also a bolting distance of latch fixing screws), especially if the latch pawl compensates for a tolerance of plus or minus five millimeters inside a pawl contour. These design details contribute to an overall size and weight of the conventional latch assembly. The additional closing finger part or input link 30 breaks with the conventional design restrictions and the latch assembly 10 can be designed with just a forty-millimeter bolting distance between the mounting apertures 14, 16 as the input link 30 rotates and slides inside the latch assembly 10.

Figure 6:
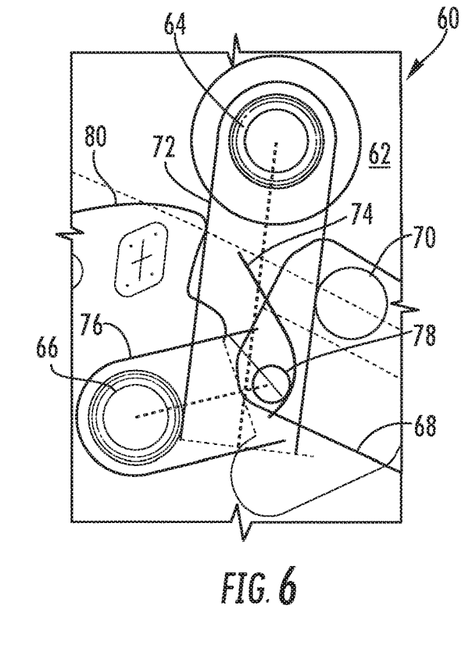
FIG. 6 is a side elevation schematic view of a latch assembly according to another embodiment, illustrated in an unlatched position.
Figure 7:
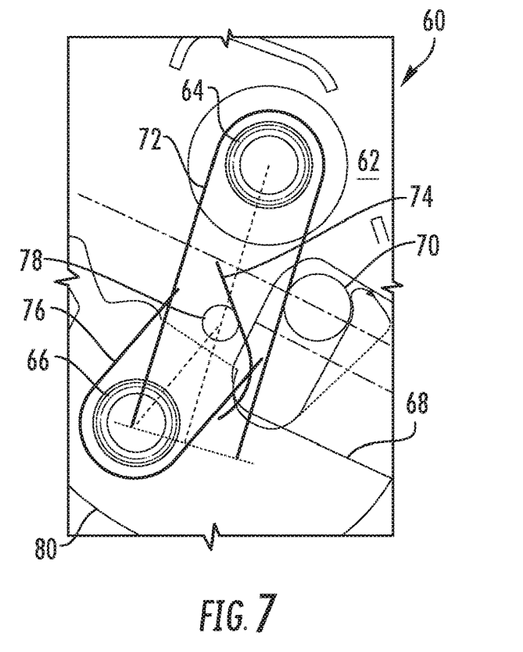
FIG. 7 is another side elevation schematic view of the latch assembly of FIG. 6, illustrated in a latched position.

FIGS. 6 and 7 illustrate a latch assembly 60 according to another embodiment. The latch assembly 60 is illustrated in an unlatched position in FIG. 6, and a latched position in FIG. 7. The latch assembly 60 includes a base plate 62 with a pair of mounting apertures 64, 66 and a receptacle 68 to receive a striker 70. A first input link 72 is pivotally connected to the first mounting aperture 64. A cam track 74 is provided in the first input link 72. A second link 76 is pivotally connected to the second mounting aperture 66. The second link 76 includes a pin 78 engaged with the cam track 74 of the first input link 72. The second link 76 is also connected to a pawl 80 that is also pivotally connected to the second mounting aperture 66.

As the striker 70 is received within the receptacle 68, the striker 70 engages the first input link 72. The striker 70 actuates the first input link 72 and the second link 76 to converge while rotating the pawl 80 to engage and latch the striker 70. The latch assembly 60 provides the same benefits and advantages of the prior latch assembly 10 with a pair of input links 72, 76.

Figure 8:
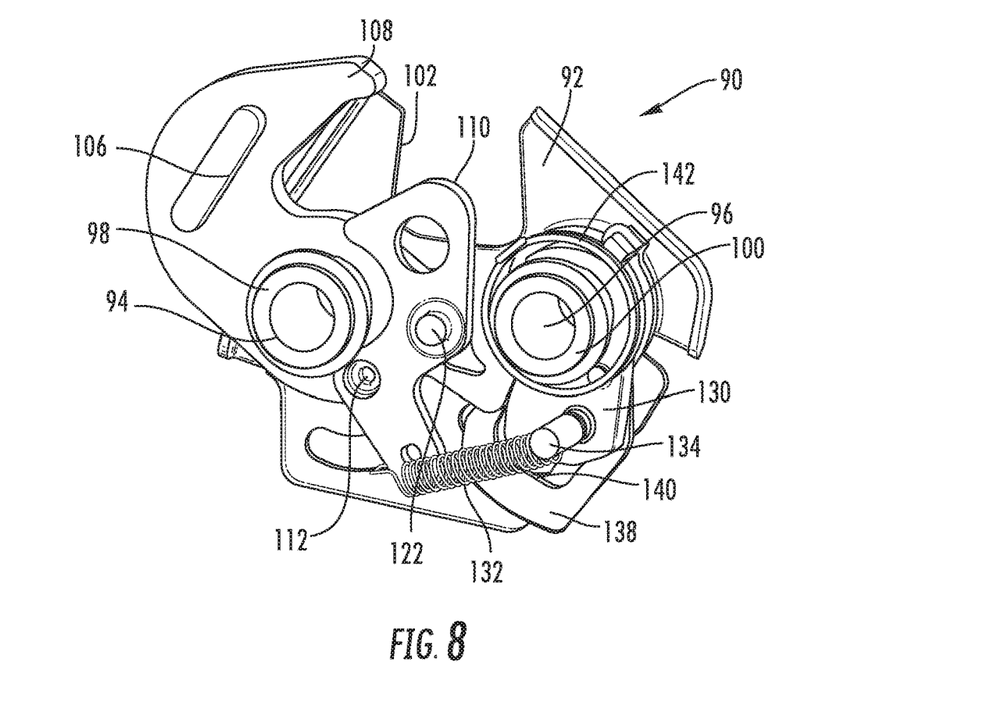
FIG. 8 is a front side perspective view of a latch assembly according to another embodiment, illustrated partially disassembled in an unlatched position.
Figure 9:
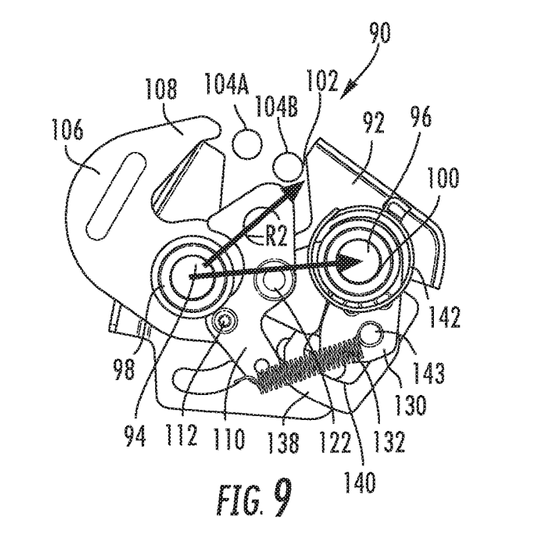
FIG. 9 is another front side perspective view of the latch assembly of FIG. 8, illustrated in the unlatched position.
Figure 10:
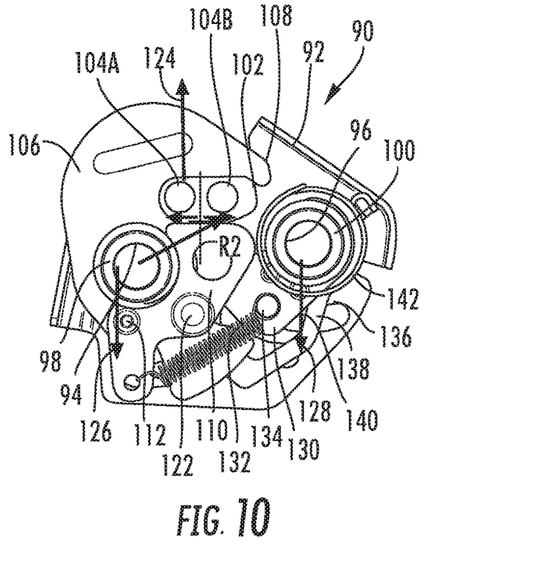
FIG. 10 is another front side perspective view of the latch assembly of FIG. 8, illustrated in the latched position.

FIGS. 8-13 illustrate a seat latch assembly according to another embodiment and referenced by numeral 90. Similar to the first embodiment, the latch assembly 90 includes a base plate 92 with a pair of mounting apertures 94, 96 for mounting the latch assembly 90 to a seat component, such as a seat back (not shown). A pair of bushings 98, 100 are provided in the mounting apertures 94, 96 to provide pivotal connections for components of the latch assembly 90. A receptacle 102 is also formed in the base plate 92 for receipt of a striker 104A, 104B (FIGS. 9 and 10). The striker 104A, 104B may be stationary, and provided on a vehicle body for engagement with the latch assembly 90 upon pivoting of an associated seatback to the vehicle body. The striker 104A, 104B is depicted in two different positions as indicated by the differing reference numerals to illustrate extreme position variances due to acceptable dimensional tolerances. According to one embodiment, an acceptable tolerance may be plus or minus five millimeters.

A pawl 106 is pivotally connected to the base plate 92 about the bushing 98. The pawl 106 includes a latch hook 108 for retaining the striker 104A, 104B in a latched position of FIGS. 10, 12 and 13. The pawl 106 is illustrated in an unlatched position in FIGS. 8, 9 and 11. An input link 110 is pivotally connected to the pawl 106 at pin 112. The pin 112 is illustrated in FIGS. 8-10 and 13. The input link 110 is sized to extend into the receptacle 102 to engage the striker 104A, 104B. The input link 110 is driven by the striker 104A, 104B, and transmits the latching kinematics to the pawl 106. Therefore, as the latch assembly 90 receives the striker 104A, 104B from FIGS. 8, 9 and 11 to FIGS. 10, 12 and 13, the input link 110 is driven from the receptacle 102, thereby rotating the pawl 106 about the bushing 98 so that the latch hook 108 engages and retains the striker 104A, 104B within the receptacle 102.

Figure 11:
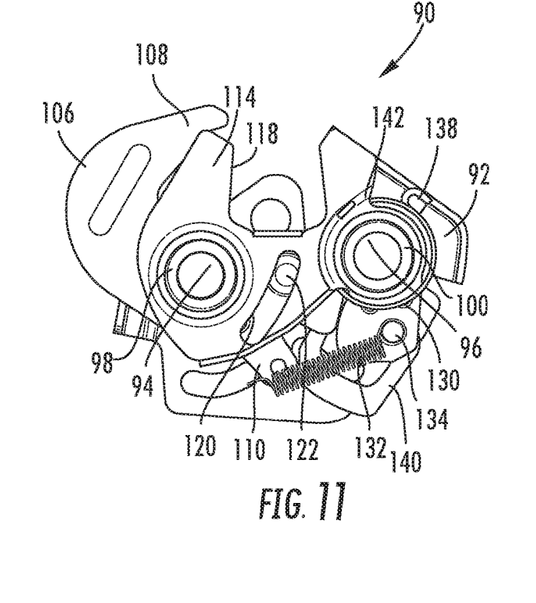
FIG. 11 is another front side perspective view of the latch assembly of FIG. 8, illustrated in the unlatched position.
Figure 12:
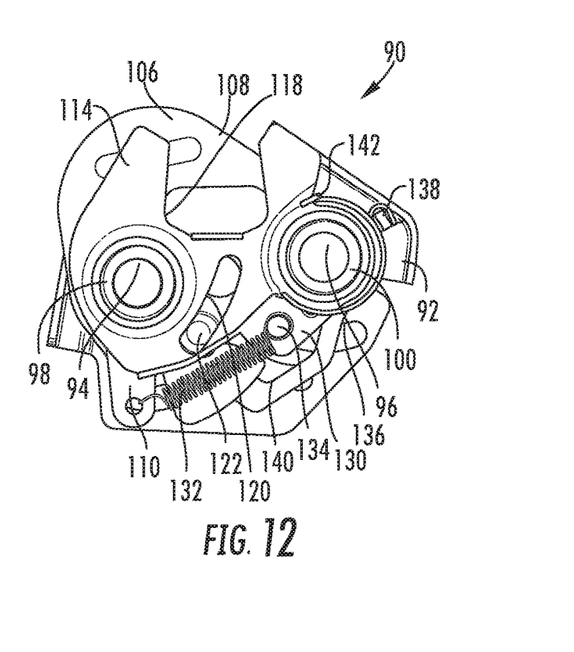
FIG. 12 is another front side perspective view of the latch assembly of FIG. 8, illustrated in the latched position.
Figure 13:
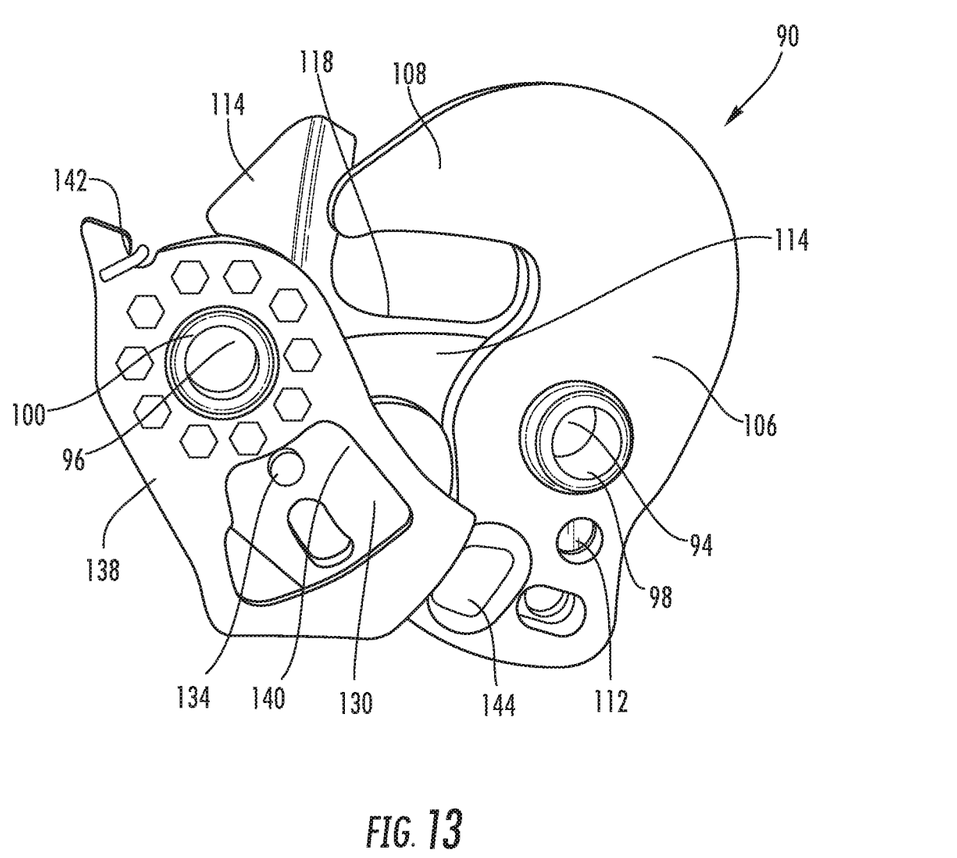
FIG. 13 is a rear side perspective view of the latch assembly of FIG. 8, illustrated partially disassembled in the latched position.

The latch assembly 90 includes a cover plate 114 as illustrated in FIGS. 11-13. The cover plate 114 is fastened to the base plate 92 upon the bushings 98, 100. The cover plate 114 encloses the latch assembly 90 with the base plate 92. The cover plate 114 also includes a receptacle 118 for receipt of the striker 104A, 104B. A slot 120 is formed in the cover plate 114. A pin 122 connects the input link 110 to the slot 120 of the cover plate 114 so that the input link 110 can pivot relative to the pawl 106 and pivot and slide relative to the cover plate 114. This motion results in the input link 110 rotating and translating toward the bushing 98 of the pawl 106 as depicted in FIGS. 10 and 12. Consequently, a distance between the input link 110 and the first bushing 98 is reduced, while providing more clearance between the input link 110 and the second bushing 100. As illustrated in FIGS. 9 and 10, a radius R2 of an outward end of the input link 110 relative to the first bushing 98 reduces as the latch assembly 90 is latched to the striker 104A, 104B.

The latch assembly 90 with the input link 110 eliminates a driving contour on the pawl 106 as known in the prior art. The input link 110 also directly transmits the input from the striker 104A, 104B into the pawl 106, thereby requiring a smaller distance, such as forty millimeters, between the bushings 98, 100 than the prior art, while still accommodating a tolerance variation of plus or minus five millimeters for the position of the striker 104A, 104B. By reducing the dimension between the bushings 98, 100, the latch assembly 80 is more compact and a weight of the latch assembly 80 can be reduced. Additionally, and with reference to FIG. 10, the mounting apertures 94, 96 are oriented generally perpendicular to a latch load application 124 so that resultant loads 126, 128 are evenly distributed between the two mounting apertures 94, 96.

Referring now to FIGS. 8-13 a cam catch 130 is pivotally connected to the second bushing 100. An extension spring 132 connects the cam catch 130 to the input link 110 to urge the input link 110 into the receptacles 102, 118, which consequently urges the pawl 106 to the open, unlatched position. Upon receipt of the striker 104A, 104B into the receptacles 102, 118, the striker 104A, 104B engages the input link 110 and overcomes the bias of the spring 132, thereby actuating the input link 110 and consequently the pawl 106.

The spring 132 can be connected to the cam catch 130 upon a pin 134. The pin 134 extends through the cam catch 130 and into an arcuate slot 136 (depicted in FIGS. 10 and 12) formed through the base plate 92.

A cam clamp 138 is also pivotally connected to the second bushing 100 as illustrated in FIGS. 8-13. The cam clamp 138 is oriented between the cam catch 130 and the base plate 92. An aperture 140 is formed through the cam clamp 138 to permit the pin 134 to pass through the cam clamp 138. The aperture 140 also engages the pin to connect the cam clamp 138 and the cam catch 130.

A torsion spring 142 is connected to the cam clamp 138 and the cover plate 114 to actuate the cam clamp 138 into engagement with the pin 134 to consequently bias the cam catch 130 into engagement with the pawl 106. Once the pawl 106 is in the latched position of FIGS. 10, 12 and 13, the cam clamp 138 engages the pawl 106 to clamp the pawl 106 upon the striker 104A, 104B.

Manual unlatching of the latch assembly 90 may be permitted by manual actuation of the cam clamp 138 directly or through a separate mechanism, such as a cable driven by a handle. Actuation of the cam clamp to rotate counter-clockwise overcomes the torsion spring 142, and thereby engages the pin 134 and pivots the cam catch 130 counter-clockwise to provide clearance to permit the pawl 106 to be rotated counter-clockwise to the unlatched position. The rotation of the cam catch 130 extends the spring 132, which pivots the input link 110 against the striker 104A, 104B to disengage from the striker 104A, 104B. The pivoting of the input link 110 consequently pivots the pawl 106 to the unlatched position.

In the unlatched position of the pawl 106 in FIGS. 8, 9 and 11, the torsion spring 142 actuates the cam clamp 138 into engagement with the pin 134 to pivot the cam catch 130 against the pawl 106 to maintain the pawl 106 in the unlatched position.

Referring now to FIG. 13, a projection 144 extends from a rear surface of the pawl 106 toward the base plate 92 (not shown in FIG. 13). The cam clamp 138 engages the pawl projection 144 in the latched position to eliminate any free-play and associated unwanted vibrations (known in the art as buzz, squeak and rattle), which may be caused tolerance variations. Likewise, the cam clamp 138 also engages the projection 144 in the unlatched position to eliminate free-play. The cam based operation of the latch assembly 90 addresses tolerance variances from manufacturing tolerances, wear or varying temperatures without requiring rubber bumpers as known in the art.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat latch assembly comprising:
    a mounting plate with a pair of mounting apertures to mount the latch assembly to a seat component, and a receptacle for receipt of a striker;
    a pawl pivotally connected to a first mounting aperture of the pair of mounting apertures of the mounting plate;
    an input member operably connected to the pawl and oriented relative to the receptacle to engage the striker and actuate the pawl to a latched position;
    wherein the pawl comprises a latch hook to retain the striker in the latched position;
    wherein the pawl lacks a driving contour so that the pawl is not actuated by contact with the striker; and
    a cover plate mounted to the mounting plate and spaced apart from the mounting plate to enclose the pawl and the input member therebetween;
    wherein a guide is formed into at least one of the mounting plate and the cover plate; and
    wherein the input member cooperates with the guide to pivot and slide relative to the mounting plate during movement between the latched position and an unlatched position.

2. The seat latch assembly of claim 1 wherein a latch load application upon the latched striker is perpendicular to the pair of mounting apertures.

3. The seat latch assembly of claim 1 further comprising a pair of bushings, each received within one of the pair of mounting apertures, wherein the pawl is pivotally connected to one of the pair of bushings.

4. The seat latch assembly of claim 1 further comprising:
    a cam catch pivotally connected to a second mounting aperture of the pair of mounting apertures; and
    a biasing member operably connected to the cam catch and the pawl to bias the pawl to an unlatched position.

5. The seat latch assembly of claim 4 wherein the biasing member is connected to the cam catch and the input member.

6. The seat latch assembly of claim 4 wherein the biasing member biases the cam catch against the pawl in the unlatched position to maintain the unlatched position when the striker is not received in the receptacle.

7. The seat latch assembly of claim 4 further comprising:
    a cam clamp pivotally connected to the second mounting aperture in cooperation with the cam catch; and
    a second biasing member operably connected to the cam clamp to bias the cam catch to engage the pawl and maintain the pawl in the latched position.

8. The seat latch assembly of claim 4 further comprising:
    a cam clamp pivotally connected to the second mounting aperture; and
    a second biasing member operably connected to the cam clamp to bias the cam clamp to engage the pawl and clamp the pawl in the latched position.

9. The seat latch assembly of claim 1 wherein the input member slides toward the mounting aperture that is pivotally connected to the pawl during movement from the unlatched position to the latched position.

10. The seat latch assembly of claim 9 further comprising a pair of bushings each received within one of the pair of mounting apertures; and
    wherein the input member is contoured to provide clearance for the one of the pair of bushings for compactness of the seat latch assembly in the latched position.

11. The seat latch assembly of claim 1 wherein the pair of mounting apertures are spaced apart a distance of up to forty millimeters.

12. A seat latch assembly comprising:
    a mounting plate with a pair of mounting apertures to mount the latch assembly to a seat component, and a receptacle for receipt of a striker;
    a pawl pivotally connected to a first mounting aperture of the pair of mounting apertures of the mounting plate;

an input member operably connected to the pawl and oriented relative to the receptacle to engage the striker and actuate the pawl to a latched position;

wherein the pawl comprises a latch hook to retain the striker in the latched position;

wherein the pawl lacks a driving contour so that the pawl is not actuated by contact with the striker;

wherein the input member further comprises an input link pivotally connected to a second mounting aperture of the pair of mounting apertures of the mounting plate;

a second link connected to the pawl to pivot relative to the first mounting aperture with the pawl; and a follower mounted to the second link in engagement with a cam track on the input link, so that as the striker is received in the receptacle and engages the input link, the input link and the second link converge while rotating the pawl to engage and latch the striker.

13. The seat latch assembly of claim 12 further comprising a second link connected to the pawl and the input link to pivot relative to the first mounting aperture with the pawl.

14. A seat latch assembly comprising:

a mounting plate with a pair of mounting apertures spaced apart a distance of up to forty millimeters and a receptacle sized for receipt of a striker with a position tolerance of at least plus or minus one half of a width of the striker;

a pair of bushings, each received within one of the pair of mounting apertures;

a pawl pivotally connected to a first bushing of the pair of bushings, with a latch hook to retain the striker in a latched position;

an input member operably connected to the pawl and oriented and sized relative to the receptacle to extend into the receptacle in an unlatched position to engage the striker and actuate the pawl to a latched position while moving relative to the pawl, wherein a latch load application upon the latched striker is perpendicular to the pair of mounting apertures; and a cover plate mounted to the mounting plate and spaced apart from the mounting plate to enclose the pawl and the input member therebetween, wherein a guide is formed into at least one of the mounting plate and the cover plate;

wherein the input member cooperates with the guide to pivot and slide relative to the mounting plate and toward the first bushing during movement from the unlatched position to the latched position;

wherein the input member is contoured to provide clearance for the first bushing for compactness of the seat latch assembly in the latched position; and wherein the pawl lacks a driving contour so that the pawl is not actuated by contact with the striker.

* * * * *